United States Patent [19]

Gruber

[11] Patent Number: 4,464,710
[45] Date of Patent: Aug. 7, 1984

[54] SIMPLIFIED D.C. TO D.C. CONVERTER

[75] Inventor: Robert P. Gruber, North Olmsted, Ohio

[73] Assignee: The United States of America as represented by the Administrator of the National Aeronautics and Space Administration, Washington, D.C.

[21] Appl. No.: 368,188

[22] Filed: Apr. 14, 1982

[51] Int. Cl.³ ............................................. H02M 3/335
[52] U.S. Cl. ........................................ 363/22; 363/49; 323/901
[58] Field of Search ............................ 363/17, 22–23, 363/49, 97, 132–134; 331/113 A; 323/901

[56] References Cited

U.S. PATENT DOCUMENTS

| | | | |
|---|---|---|---|
| 3,444,481 | 5/1969 | Fisher | 363/49 X |
| 4,004,251 | 1/1977 | Hesler et al. | 363/22 X |
| 4,103,356 | 7/1978 | Finlay | 363/22 |
| 4,202,031 | 5/1980 | Hesler et al. | 363/49 X |
| 4,245,177 | 1/1981 | Schmitz | 315/205 |
| 4,390,937 | 6/1983 | Clark, Jr. | 363/49 |

FOREIGN PATENT DOCUMENTS

| | | | |
|---|---|---|---|
| 804724 | 1/1969 | Canada | 363/22 |
| 147418 | 11/1979 | Japan | 363/22 |

OTHER PUBLICATIONS

Hiramatsu et al., "Switch Mode Converter Using High-Frequency Magnetic Amplifier", Power Conversion International, vol. 6, No. 2, Mar.–Apr., 1980, pp. 75–76 and 79–82.

Primary Examiner—Peter S. Wong
Attorney, Agent, or Firm—Norman T. Musial; John R. Manning; James A. Mackin

[57] ABSTRACT

A d-c to d-c converter which can start with a shorted output and which regulates output voltage and current is disclosed. Voltage controlled switches directed current through the primary of a transformer the secondary of which includes virtual reactance. The switching frequency of the switches is appropriately varied to increase the voltage drop across the virtual reactance in the secondary winding to which there is connected a low impedance load. A starting circuit suitable for voltage switching devices is provided.

1 Claim, 4 Drawing Figures

SIMPLIFIED D.C. TO D.C. CONVERTER

ORIGIN OF THE INVENTION

This invention was made by an employee of the United States Government and may be manufactured or used by or for the Government without the payment of any royalties thereon or therefor.

DESCRIPTION

1. Technical Field

This invention relates to electrical power supply and is directed more particularly to circuits for converting direct current at one voltage to either a higher or lower voltage.

Many different types of D.C. to D.C. converters are known. In general, state of the art D.C. to D.C. converters incorporate solid state switching devices and saturable transformers. Depending upon the application for which a D.C. to D.C. converter is to be used, other ancillary circuits are incorporated in such converters. Examples of such circuits are active voltage limiting circuits, closed-loop current control circuits, output short-circuit current limiting circuits, pre-regulation circuits, and in-rush current limiting circuits. All of these circuits increase the cost, complexity, weight and probability of malfunction.

It is highly desirable that the foregoing auxiliary or ancillary circuits, be eliminated from D.C. to D.C. converters where weight and reliability are important considerations. D.C. to D.C. converters used in space vehicles would be an example of a use depending on these factors.

It is contemplated that some future space vehicles will use ion thrusters (ion engines) for maneuvering as well as for traveling. The electrical power for the ion thrusters will be obtained from solar cell arrays. The voltages from the solar cell arrays will be converted to respective different voltages, as required by the various circuits in the ion thrusters. Ion engines in general require several D.C. to D.C. converters. Two of these D.C. to D.C. converters have unique requirements. One powers what is known as a neutralizer keeper while the other powers what is known as a cathode keeper.

Both of these D.C. to D.C. converters must meet certain requirements such as galvanic isolation of the input and output circuits, a short circuit output current which is substantially constant over a 2:1 input voltage range and a first-order correction of any increase in output current due to increased input voltage. In addition, such converters should have low weight, a minimum number of parts and high reliability.

2. Background Art

U.S. Pat. Nos. 3,249,894 and 3,297,959, both to R. P. Massey, disclose D.C. to D.C. converters employing asymmetric oscillators controlled by feedback circuits connected to the output. Output voltage is controlled by varying the duty cycle of the oscillator power transistor. Because of the feedback circuits, the output is not isolated from the oscillator portion of the converter.

U.S. Pat. No. 3,327,244 to C. W. Fay et al discloses a D.C. to D.C. converter wherein the unidirectional output current is directed through a winding on the switching transformer of the oscillator to control its frequency at a predetermined value.

U.S. Pat. No. 3,377,540 to K. H. Meyer shows a D.C. to D.C. converter having a circuit connected between an output terminal and the oscillator section of the converter to reduce the magnitude of the oscillations in the oscillator circuit under overload conditions.

U.S. Pat. No. 3,611,205 to Ogawa discloses a saturable core oscillator having an extra winding on the transformer, which winding is connected in a full wave bridge rectifying circuit arrangement to a zener diode. This arrangement insures a constant frequency output from the oscillator.

U.S. Pat. No. 2,852,730 to Magnuski shows a D.C. to D.C. converter in which the oscillator section comprises a pair of transistor switches controlled from the feeback winding carried on a portion of the core of the switching transformer which is of reduced cross section and saturates to cause switching action.

U.S. Pat. No. 3,590,362 to Kakalec discloses an inverter circuit which drives a ferro resonant regulator and utilizes a core-saturation-simulating circuit in the output to vary the oscillator frequency such that the ferroresonant circuit will maintain the A.C. output voltage at a relatively constant value.

U.S. Pat. No. 3,777,248 to Vermolen shows a D.C. to D.C. converter having a saturable core oscillator and employing a saturable choke coil in one of the D.C. output leads to insure that the oscillator will start. Other U.S. Pat. Nos. covering D.C. to D.C. converters are: 3,241,032 to Firestone; 3,586,957 to Case; 3,996,506 to Kichak; and 4,061,957 to Vader. These four patents all employ circuitry wherein a portion of the output voltage is fed back to the oscillator section to regulate input or output current or output voltage.

DISCLOSURE OF THE INVENTION

In accordance with the objects of the present invention, there is provided a D.C. to D.C. converter comprised of a transformer having a primary winding through which current is directed in alternate directions by metal oxide semiconductor field effect transistors (MOSFET) connected between the primary winding and a D.C. source or battery. A second winding of the transformer is connected to a rectifying and filter circuit to provide unidirectional output current. The primary and secondary windings of the transformer are carried on the respective outer legs of an E-core with the center leg of the core providing a leakage reactance. This leakage reactance has the same effect as placing an inductor in series with the rectifiers in the output circuit.

The transformer core may be of the saturable type to effect switching of the transistors or, alternatively, an additional winding on the transformer may be connected to the primary of a small saturable transformer whose secondary is connected to the gates of the transistors.

Starting circuits comprised of resistors, capacitors and diodes connected in particular configurations are also utilized.

BRIEF DESCRIPTION OF THE DRAWINGS

The details of the invention will be described in connection with the accompanying drawings in which.

BEST MODE FOR CARRYING OUT THE INVENTION

Figure 1:
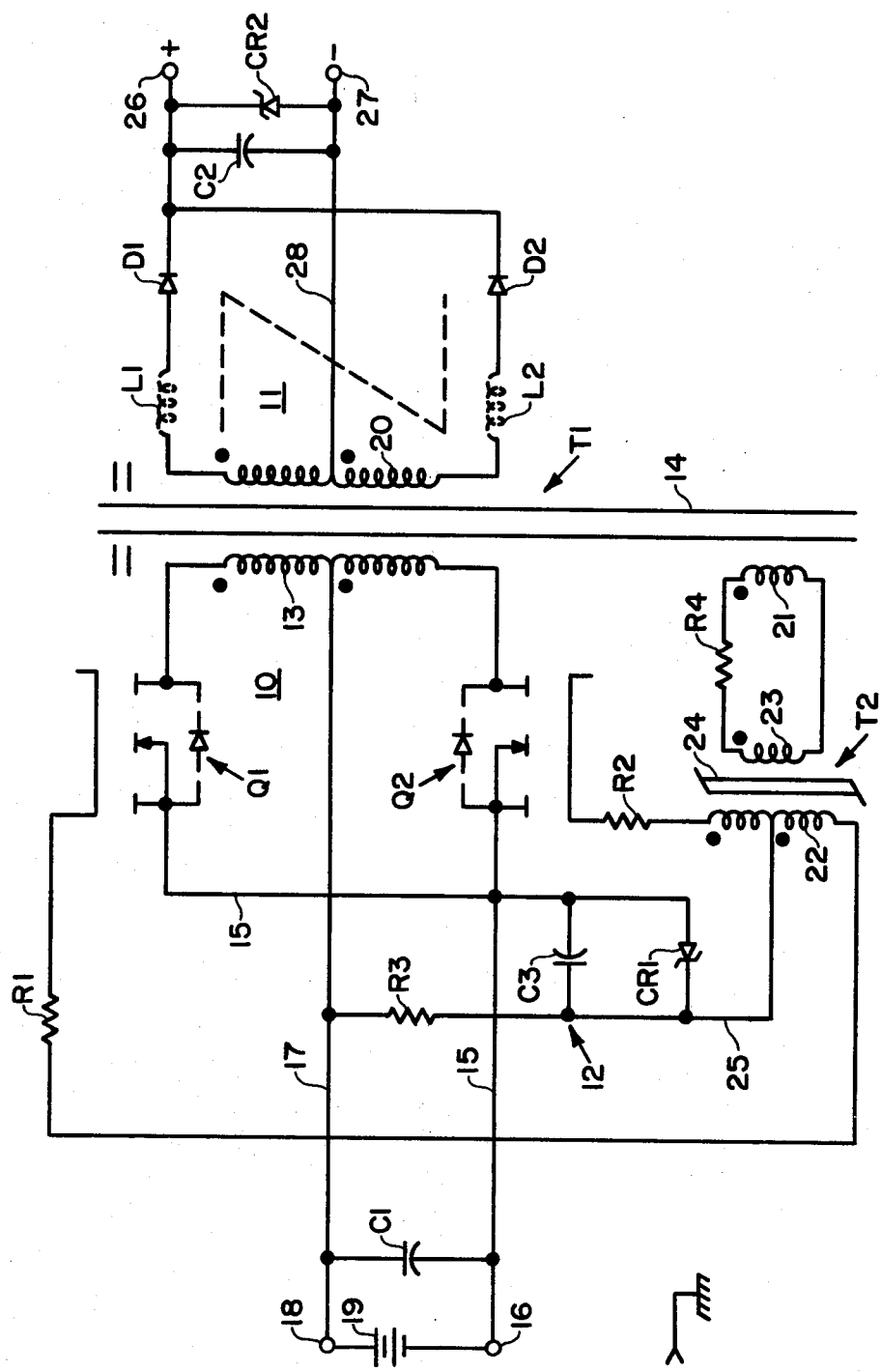
FIG. 1 is a schematic diagram of a D.C. to D.C. converter employing two MOSFETs and a small auxiliary switching transformer.

Referring now to FIG. 1, there is shown in accordance with the invention a D.C. to D.C. converter comprising an oscillator section 10, a power output section 11 and a start section 12. Oscillator section 10 is comprised of MOSFETs Q1 and Q2 the drains of which are connected to respective outer ends of a center tapped winding 13 which is carried on a core 14 of a transformer T1. The sources of MOSFETs Q1 and Q2 are both connected via a lead 15 to a negative power input terminal 16. The center of winding 13 is connected through a lead 17 to a positive input terminal 18, a battery 19 being connected between the input terminals 16 and 18. A capacitor C1 is connected between leads 15 and 17 to provide a low impedance path for alternating currents to prevent voltage spikes that could damage MOSFETs Q1 and Q2.

Figure 3:
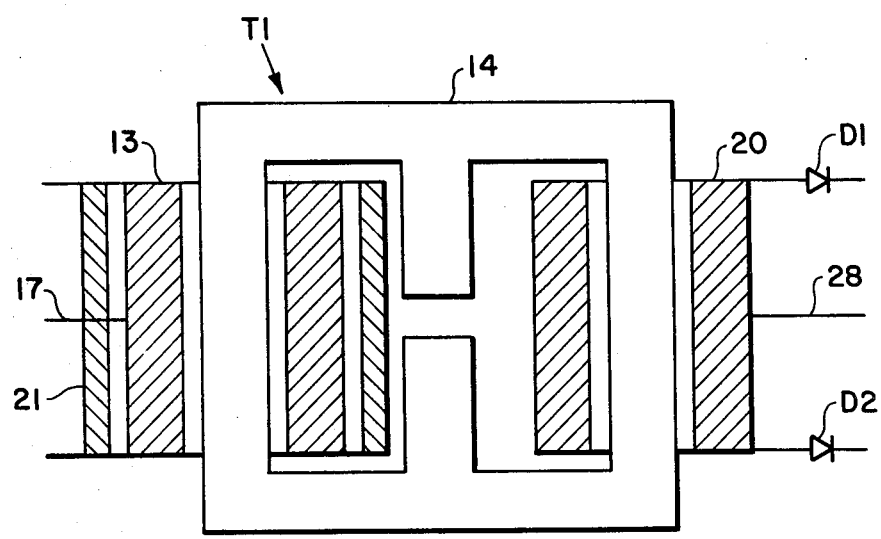
FIG. 3 is a sectional view of an E-core transformer as employed with the circuit of FIG. 1.

Also carried on the core 14 of transformer T1 is a center tapped secondary winding 20 and a tertiary winding 21. The core 14 comprises a pair of E-shaped ferrite cores arranged such that there is a gap between the ends of the center legs. A primary winding 13 of transformer T1 is wound on one of the outer legs while the secondary winding 20 is wound on the other. The tertiary winding 21 is wound on the same outer leg as primary winding 13. The air gap in the center legs of core 14 provides a leakage reactance which effectively places virtual inductors L1 and L2 in series with the respective outer ends of center tapped secondary winding 20. FIG. 3 illustrates the primary winding 20 and the tertiary winding 21 carried on a first outer leg of E-core transformer T1 while the secondary winding 13 is carried on a second outer leg. As shown, the center leg of T1 includes an air gap as discussed previously.

To the end that MOSFETs Q1 and Q2 will operate in a switching mode, their gate electrodes are connected through respective resistors R1 and R2 to the respective outer ends of a center tapped winding 22 carried with a primary winding 23 on the saturable core 24 of a switching transformer 22. The primary winding 23 is connected to the tertiary winding 21 of transformer T1 with a resistor R4 being disposed in one of the connections. With this arrangement, saturation of core 24 will cause the conducting MOSFET to lose drive whereupon the polarities on primary winding 13 reverse. This is reflected from winding 21 to the primary winding 23 of transformer T2 causing the MOSFET which had been non-conducting to turn on. Upon the next saturation of core 24, the MOSFET will again switch conducting states. The intrinsic anti-parallel diodes contained in the MOSFETS Q1 and Q2 carry reverse currents caused by L1 and L2.

Although it is possible that MOSFETs Q1 and Q2 will begin their switching action when DC power is applied across input terminals 16 and 18, there is no guarantee that switching action will start under all operating conditions. To the end that the switching action will indeed occur, starting circuit 12 is provided. This circuit includes a resistor R3 connected from the positive input lead 17 through a lead 25 to the center tap of winding 22 of transformer T2. A capacitor C3 and a zener diode CR1 are connected in parallel between the lead 25 and the negative input lead 15.

When power is applied to input terminals 16 and 18, positive voltage is applied to the gate electrodes of MOSFETs Q1 and Q2 through resistor R3 to respective halves of winding 22 and resistors R1 and R2, respectively. The MOSFET with the lowest threshhold voltage will conduct first. A voltage reflected to transformer T2 from the tertiary winding 21 of transformer T1 prevents the other MOSFET from conducting. When the core of transistor T2 saturates, the MOSFET will switch conducting states.

Zener diode $CR_1$ limits the gate co source for wide changes in converter input voltages. $C_3$ provides a low impedance path for currents during the switching interval and improves performance slightly.

To provide the desired direct current output at terminals 26 and 27, the center tap of winding 20 is connected via a lead 28 to terminal 27 while the outer ends of winding 20 are connected through respective diodes D1 and D2 to positive terminal 26. A filter capacitor C2 is connected across the output terminals 26 and 27 to average the pulsating direct current from $D_1$ and $D_2$ thereby providing a more constant output current. At no load the voltage across the capacitor can increase due to low energy switching transients. A zener diode CR2 can be connected in parallel with the capacitor C2 to limit the output voltage at no load caused by the switching transients. This allows capacitor C2 to have a lower voltage rating as wll as providing a safe path for externally induced transient currents due to possible ion thruster arcs or short circuits.

Due to the inductors L1 and L2 of the power output circuit 11, the load reflected to the oscillator circuit 10 is inductive. Consequently, oscillator 10 starts easily even with a short circuit between output terminals 26 and 27. Further, inductors L1 and L2 help to regulate output voltage and to limit output current. These advantages are obtained because the frequency of operation of oscillator 10 increases linearly with an increase in input voltage. Thus, if the frequency of oscillator 10 increases due to an increase in input voltage, the impedance of inductors L1 and L2 increases to absorb some of the voltage increase which would otherwise appear between output terminals 26 and 27.

One particular use of the D.C. to D.C. converter of FIG. 1 is to provide electrical power to the resistive heaters of an ion thruster. In ion thrusters the electrical power to the heaters can be modulated, being supplied in a form of pulses. The circuit of FIG. 1 can provide a pulsed D.C. output by providing D.C. power to the input terminals 16 and 18 in the form of pulses produced by mechanical or transistor switches. Pulsed D.C. output from the circuit of FIG. 1 can also be more efficiently obtained by connecting a commercial available OPTO coupler between the negative input lead 15 and the cathodes of a pair of clamping diodes, the anodes of which are connected to respective gates of MOSFETs Q1 and Q2. The on-off control signal is applied to a light emitting diode in the OPTO coupler to provide the desired pulsed output at terminals 26 and 27.

Figure 2:
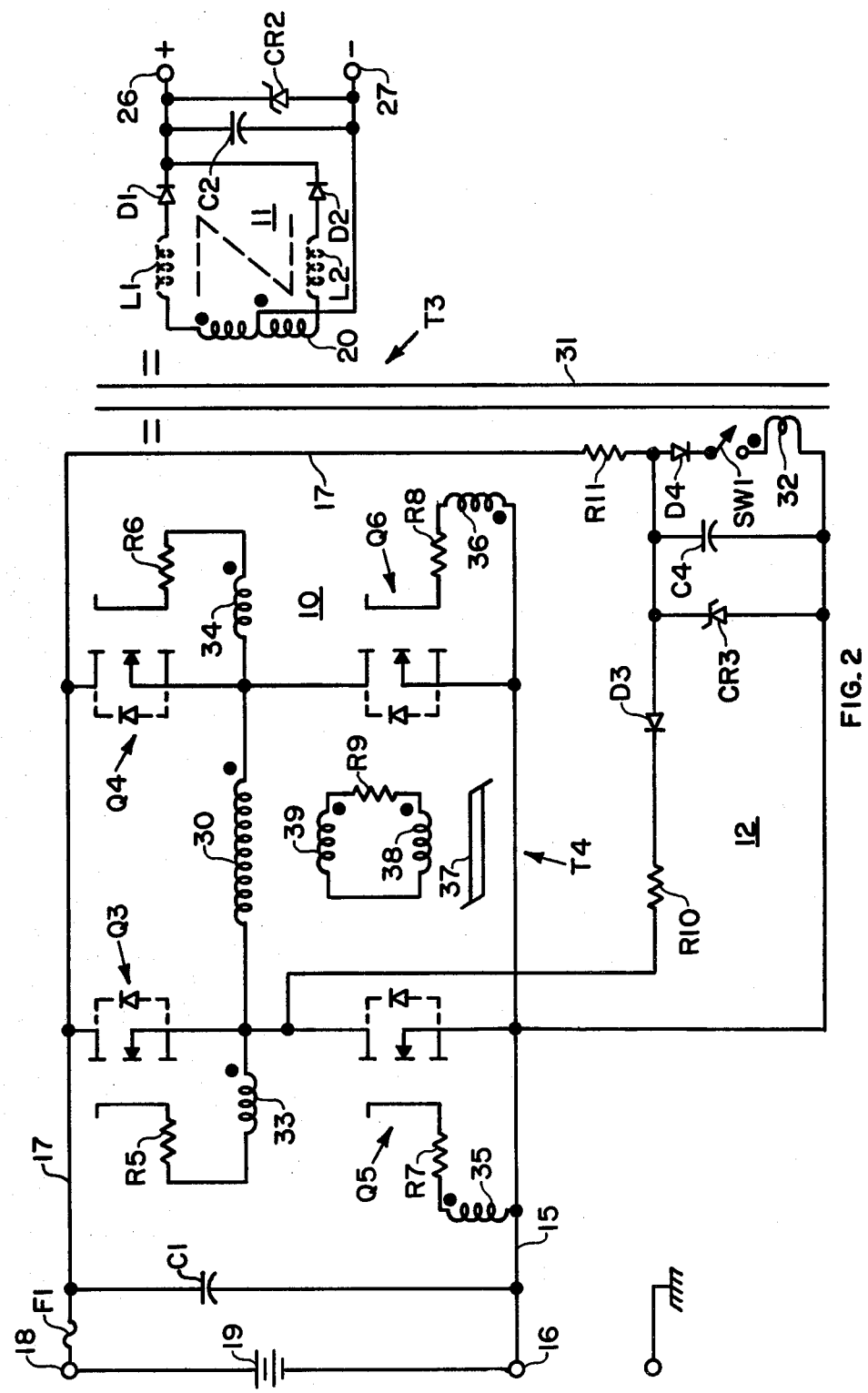
FIG. 2 is a schematic diagram utilizing a four-MOSFET bridge type oscillator.

Referring now to FIG. 2, there is shown a D.C. to D.C. converter which is similar to that of FIG. 1 and includes an oscillator section 10, a power output section 11 and a start circuit section 12. Where components in FIG. 2 correspond to those in FIG. 1, like numerals are used for identification.

The output circuit 11 of FIG. 2 is identical to that of FIG. 1. However, oscillator section 10 utilizes MOSFETs Q3 through Q6 in a bridge connected arrangement wherein a primary winding 30 is carried on one outer leg of core 31 along with a start circuit winding 32 and gate drive windings 33 and 34 for MOSFETS Q3 and Q4. The secondary winding 20 is carried on the other outer leg of core 31.

As shown in FIG. 2, MOSFETs Q3 and Q5 are serially connected between negative lead 15 and positive lead 17. Similarly, MOSFETs Q4 and Q6 are serially connected between negative lead 15 and positive lead 17. The primary winding 30 of T3 is connected between the source electrodes of MOSFETs Q3 and Q4.

In order to have MOSFETs Q4 and Q5 conduct while MOSFETs Q3 and Q6 are nonconducting, feedback windings 33 and 34 carried on core 31 of transformer T3 are connected between the source electrodes and the gate electrodes of those transistors through respective resistors R5 and R6, while feedback windings 35 and 36 carried on a saturable core 37 of transformer T4 are connected with resistors R7 and R8 between the sorce electrodes and the gate electrodes of MOSFETs Q5 and Q6, respectively. A primary winding 38 of transformer T4 is connected across a winding 39 carried on core 31 of transformer T3 in circuit with a resistance R9.

The black dots shown at the end of the windings in FIG. 2 indicate points of like voltage polarity at any given instant of time. Accordingly, it will be seen that when the gate electrodes of MOSFETs Q4 and Q5 are subjected to a positive voltage, the gate electrodes of MOSFETs Q3 and Q6 are negative. Upon saturation of core 37 of transformer T4, the voltages applied to the gate electrodes of MOSFETs Q4 and Q5 will begin to decrease causing reduced conduction of these MOSFETs. When this occurs, the polarities will reverse causing MOSFETs Q3 and Q6 to begin conducting while MOSFETs Q4 and Q5 become nonconducting.

Like the D.C. to D.C. converter shown in FIG. 1, the frequency of operation of the oscillator section 10 is directly proportional to the input voltage. Therefore, if the voltage between input terminals 16 and 18 decreases, the frequency of the oscillator will decrease. As a result, the impedance of virtual inductors L1 and L2 decreases, thereby minimizing a decrease in the output voltage between terminals 26 and 27. Of course, if the input voltage increases, the frequency of oscillator 10 will increase. In this case, the impedance of virtual inductors L1 and L2 will increase to minimize any increase of output voltage.

The starting circuit 12 for the converter of FIG. 2 includes a resistor R11, a diode D4, a commercial momentary switch SW1 and a winding 32 carried on core 31 of transformer T3, all of these components being connected serially as shown between positive lead 17 and negative lead 15. A resistor R10 and a diode D3 serially connected from a junction common to the source of MOSFET Q3 and the drain of MOSFET Q5 to a point between resistor R11 and diode D4 are also part of starting circuit 12. A zener diode CR3 and a capacitor C4 are connected in parallel across the series combination of diode D4, switch SW1 and winding 32. The capacitor C4 charges to the zener voltage to provide energy for the starting pulse.

To initiate oscillations in oscillator section 10, switch SW1 is momentarily closed causing current to flow through winding 32. The current flow through winding 32 induces voltage on winding 39 which is applied to the primary winding 38 of the saturable transformer T4. This, in turn, induces voltage on the feedback windings 35 and 36 to apply the desired voltages to the gates of transistors Q5 and Q6. At the same time winding 32 induces voltage on feedback windings 33 and 34 such that MOSFETs Q3 and Q4 are appropriately biased.

Figure 4:
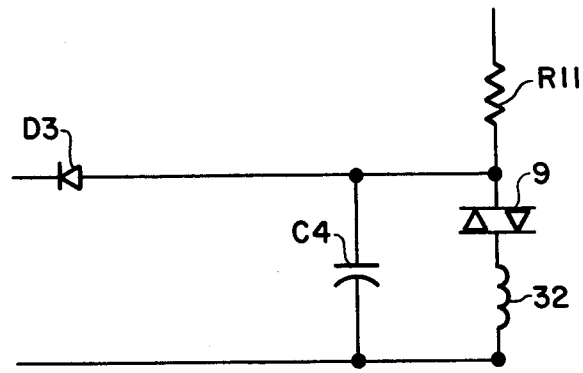
FIG. 4 is a schematic of a starting circuit of FIG. 2.

The converter can be started automatically without the need for the manual momentary switch SW1. SW1 and D4 are replaced by a diac 9 or four-layer diode and CR3 is eliminated from the circuit, as shown in FIG. 4. Capacitor C4 then charges up until the firing voltage of the diac or four-layer diode is reached. A positive going pulse is applied to winding 32 on core 31 and the circuit starts as previously described. Resistor R10 and diode D3 keep C4 from being recharged while the converter is in operation.

Because of the winding 32 and the voltage it induces on the other windings, MOSFETs Q4 and Q5 will always conduct first with MOSFETs Q3 and Q6 being nonconducting. By reversing the connections to winding 32 or by reversing the direction of its winding, MOSFETs Q3 and Q6 could be made to conduct initially. This result could also be achieved by reversing the connections or directions of windings of the feedback windings 33, 34, 35 and 36.

It will be understood that changes and modifications may be made to the above described circuits by those skilled in the art without departing from the spirit and scope of the invention as set forth in the claims appended hereto.

I claim:

1. A D.C. to D.C. converter comprising:

a transformer comprising a pair of E-shaped cores in which the ends of the outer legs are in contact and the ends of the center legs are separated by an air gap, a primary winding being carried on one of said outer legs with a tertiary winding, a center-tapped secondary winding being carried on the other outer leg in having a virtual reactance in said secondary winding due to said air gap;

voltage controlled switch means each having a control electrode and being connected between said primary winding and first and second input terminals whereby D.C. power applied to the input terminal will be directed alternately through the primary winding by switching action of said switch means, said voltage controlled switch means comprising first and second MOSFETs connected serially across said input terminal and third and fourth MOSFETs connected serially across said input terminals, the primary winding of the first transformer being connected from a common point between said first and second MOSFETs to a common point between said third and fourth MOSFETs; switching control means for causing said switch means switching rate to increase or decrease proportionally with increases or decreases of input voltage to respectively increase or decrease the voltage drop across the virtual reactance in said transformer secondary to regulate voltage and current at said output terminals;

output means comprising first and second diodes connected from respective opposite ends of said secondary winding of said first transformer to one of said output terminals, the other output terminal being connected to a center point of said secondary winding on said first transformer, and a filter capacitor connected across the output terminals; and oscillation starting means comrising a start winding carried on the core of said first transformer and being connected serially with a diac and a first voltage dropping means across the input terminal, a first capacitor connected across the series combination including said start winding and said diac, a second diode and a second voltage dropping means serially connected from a common point between said first voltage dropping means and said diac to one end of said primary winding of the first transformer whereby said first capacitor is prevented from charging except when said voltage controlled switch means are all nonconducting.

* * * * *